United States Patent [19]

Kuo

[11] Patent Number: 5,761,934
[45] Date of Patent: Jun. 9, 1998

[54] CABLE LOCK AND AN UNIVERSAL HOLD-DOWN SUPPORT

[76] Inventor: Li-Tsao Kuo, No. 47-8, Alley 36, Lane 459, Sec. 1, An Ho Rd., Tainan, Taiwan

[21] Appl. No.: 734,810

[22] Filed: Oct. 22, 1996

[51] Int. Cl.⁶ .................................................. E05B 67/06
[52] U.S. Cl. ........................ 70/49; 70/233; 70/455; 70/273
[58] Field of Search .................. 70/52, 455, 370, 70/373, 367, 233, 18, 30, 49

[56] References Cited

U.S. PATENT DOCUMENTS

| | | | |
|---|---|---|---|
| 2,782,625 | 2/1957 | Williams | 70/370 |
| 3,821,886 | 7/1974 | Ladewig | 70/373 |
| 4,023,388 | 5/1977 | Morvai | 70/455 |
| 4,286,445 | 9/1981 | Sills | 70/455 |
| 4,709,567 | 12/1987 | Appelbaum | 70/455 |
| 4,712,394 | 12/1987 | Bull | 70/18 |
| 4,819,464 | 4/1989 | Kuo | 70/49 |
| 4,831,849 | 5/1989 | Kortenbrede | 70/49 |
| 4,944,168 | 7/1990 | Koretenbrede | 70/49 |
| 5,070,713 | 12/1991 | Chen | 70/455 |
| 5,170,650 | 12/1992 | Kortenbrede | 70/49 |
| 5,291,765 | 3/1994 | Hoisington | 70/233 |
| 5,531,083 | 7/1996 | Franck, III et al. | 70/49 |
| 5,634,358 | 6/1997 | Huebschen | 70/370 |

FOREIGN PATENT DOCUMENTS 1596781  8/1981  United Kingdom ............. 70/49

Primary Examiner—Darnell M. Boucher
Attorney, Agent, or Firm—Morton J. Rosenberg; David I. Klein; Jun Y. Lee

[57] ABSTRACT

The present invention provides a cable lock and an universal hold-down support. The hold-down support has a holder integrally formed at one side and a C-shaped staying bracket at the other side. In practicing, the staying bracket is fastened on a seat support of a bicycle frame, the holder is used to locate the cable lock, in which two crossing through-holes are provided with four openings for the lock housing of the cable lock to be inserted therein as up-down and right-left side ways. The crossing point has a trepan on the side wall for the latch of the cable lock passing through and locked in the lock housing in order to locate the cable lock on the hold-down support. The cable lock includes two bayonet joined shrouds covering over a cylindrical body. The contact surfaces of the two shrouds are formed projections and sliding caulking slots correspondingly and respectively on each other as a bayonet plug and a bayonet socket, and there are certain location structures set upon between the two shrouds and the lock housing of the cable lock, and a dust cap as an escutcheon is hinged to the end of the shield to cover the keyhole.

6 Claims, 9 Drawing Sheets

CABLE LOCK AND AN UNIVERSAL HOLD-DOWN SUPPORT

BACKGROUND OF THE INVENTION

(1) Field of the Invention

The present invention relates to a cable lock and an universal hold-down support, and more particularly to a hold-down support which can locate an unique cable lock in multiple choices, and the unique cable lock is to be secured to an external shield on the lock housing of a common cable lock to provide various functions, such as protection, attraction appearance and easy of location.

(2) Description of Prior Art

The previous cable lock for a bicycle against theft, as shown in FIGS. 8 and 9 comprises a hold-down support A having an arm A1 extending from one side with a hole A11 extending from the arm A1 for securing to a bicycle frame C. The hold-support A includes a hollow cylinder A2 and a hole A21 intersecting with the hollow cylinder A2. A cable B having one end fastened to a lock core B1 extending from one end of the hollow cylinder A2. The other end of the cable is an open end which is adapted to be inserted into the hole A21 and locked therein.

The conventional hold-down support, in accordance with above-mentioned, is fixed on the bicycle frame C underneath the seat facing the rear direction which can hardly be adjusted to another position and direction. Furthermore, the cable B can only be routing either from left to right or vise versa that sometimes interfere the back seat to carry goods or person.

In the meantime, the conventional cable lock is covered with an external shield, which is made of either blasted soft rubber or hard plastic material as the lock housing to protect the lock itself and to beautify the exterior. The hard plastic shield is generally cast preformed before covering on the lock housing of the cable lock, and is welded up by heating or gluing. Hence some machines and more material should be required to increase in processing, further the production cost has to be increased.

OBJECTS AND SUMMARY OF THE INVENTION

It is a main object of the present invention to provide a hold-down support which direction is adjustable so that regardless of the location of the holder, the lock housing of the cable lock can be plugged in from at least four different directions.

It is another object of the present invention to provide a new shield for the lock housing of the cable lock that can join together directly in bayonet joint.

The present invention provides a hold-down support and a lock housing shield of a cable lock. The hold-down support has a holder at one side and a C-shaped staying bracket at another side. In practicing, the staying bracket is fastened on the seat supporting frame of the bicycle frame, the holder is used to locate the cable lock, in which two crossing through-holes provide four openings for the lock housing of the cable lock to plug in from either up-down or right-left directions, and at the corner of the crossing point there is a trepan on the side wall for the latch of the cable lock passing through and locked in the lock housing in order to locate the cable lock on the hold-down support. The shield of the lock housing of the cable lock is composed of two bayonet joining shrouds, wherein the contact surfaces of the two shrouds are formed projections and sliding caulking slots correspondingly respectively on each other as a bayonet plug and a bayonet socket, and there are certain location structures set upon between the two shrouds and the lock housing of the cable lock, and a dust cap as an escutcheon is hinged to the end of the shield to cover the keyhole.

DETAILED DESCRIPTION OF PREFERRED EMBODIMENTS

Figure 1:
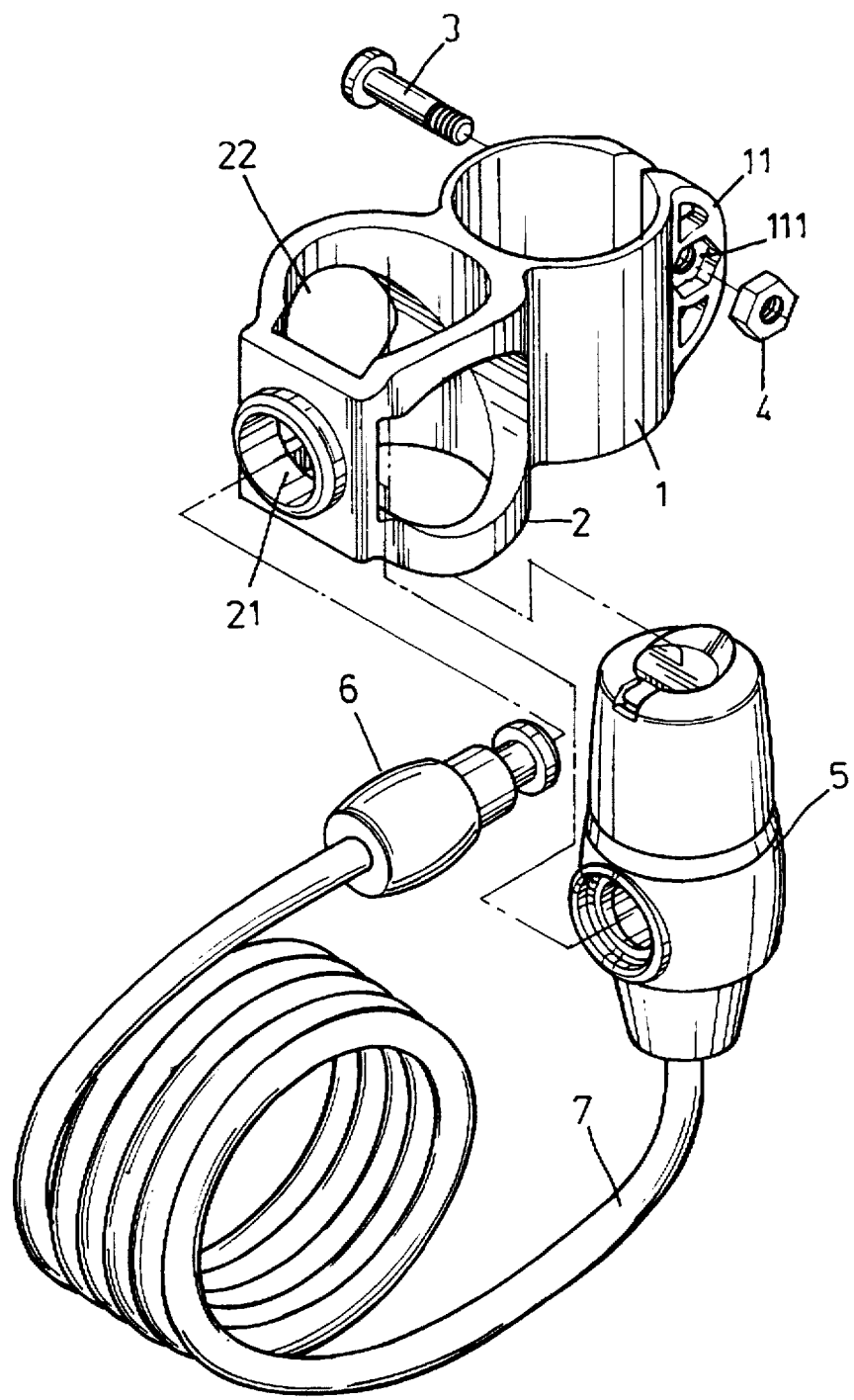
FIG. 1 is a perspective view of the present invention.

Referring to FIG. 1, the present invention includes a hold-down support and a cable lock. The hold-down support consists of a staying bracket 1 integral with a holder 2. The cable lock is composed of a lock housing 5, a latch 6 and a cable 7.

The staying bracket 1 is a C-shaped bracket having a couple opposite lips 11 formed on the respective edges of the opening with a fixing hole 111 for a bolt 3 and a nut 4 securing to it.

The holder 2 is an universal bracket having a trepan 21 on the front wall opposing the staying bracket 1, in which two crossing through-holes form up-down and right-left are formed providing four openings 22.

Figure 2:
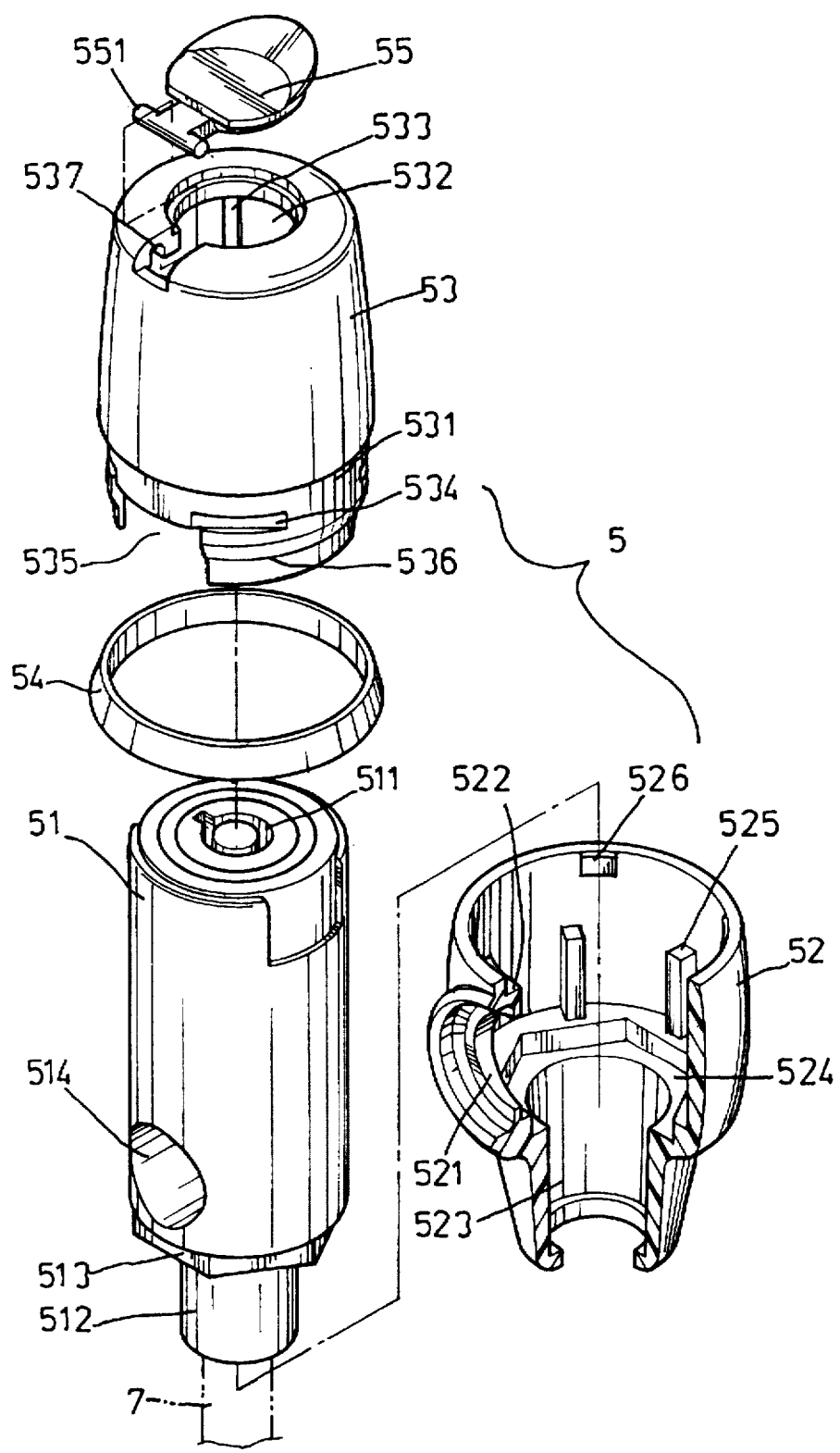
FIG. 2 is an exploded view of a lock housing of a cable lock of the present invention.

The lock housing 5 of the cable lock, as shown in FIG. 2, comprises a cylindrical body 51, two shrouds 52 53, an ornamental ring 54 and an escutcheon 55. Wherein, the cylindrical body 51 is a lock unit with a keyhole 511 at one end, a retainer shroud 512 with a polygonal portion 513 at another end, and a locking hole 514 at one side. The two shrouds 52 53 sleeve over the cylindrical body 51, therein a chucking lug 522 and a projection 526 are formed in the inner wall nearby the edge of the opening of the shroud 52 as a bayonet plug for connecting with bayonet-joint portion 531 on the shroud 53. The bayonet-joint portion 531 of the shroud 53 has a sliding slot 534 and an opening 535 on one end as a bayonet socket, and a beveled shoulder 536 at the root for the ornamental ring 54 to slide thereon. For sticking on the cylindrical body 51, an open hole 523 with a polygonal root recess 524, corresponding both in size and in shape to the polygonal portion 513 of the retainer shroud 512 of the cylindrical body 51, is formed at one end, plural ribs 525 are formed on the inner wall, and a through-hole 521 is formed on the side wall perpendicular and interconnect with the hollow space for displaying the locking hole 514 of the cylindrical body 51. The shroud 53, further comprises a hole 532 at the top end corresponding to the keyhole 511 of the cylindrical body 51, and several ribs spaced from each other on the inner wall, and a gap on one side of the hole 532 having two opposite grooves 537 for an escutcheon 55 pivoting therein with a couple of salient pivoting poles 551.

Figure 3:
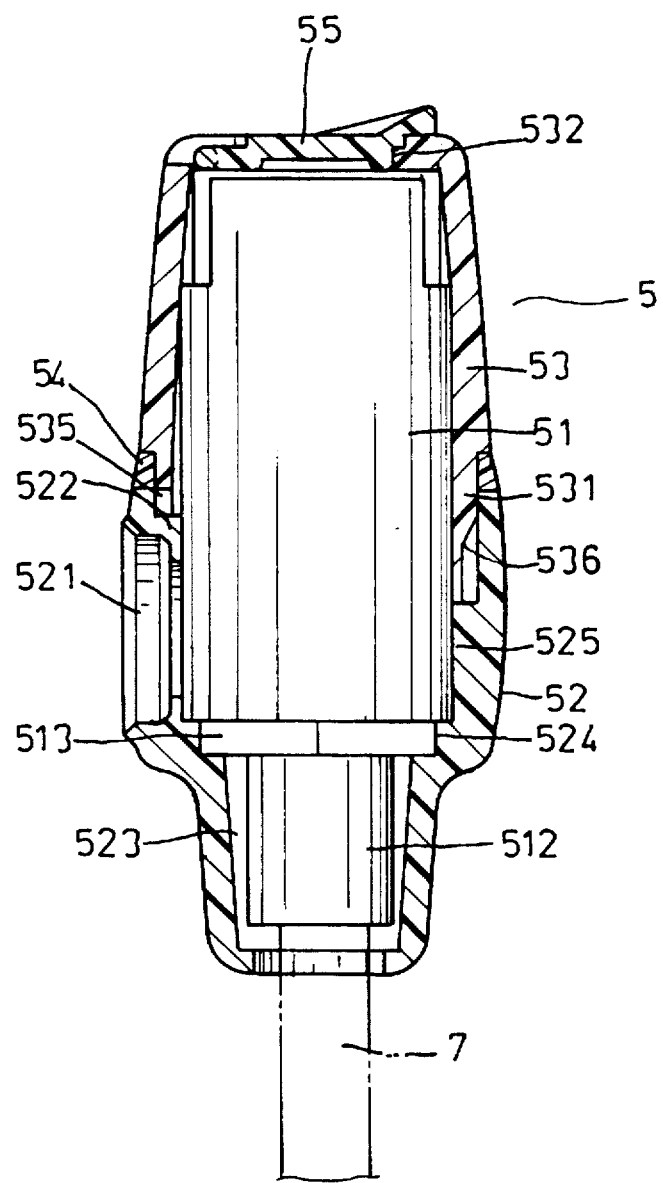
FIG. 3 is a perspective view of FIG. 2, partially sectioned.

In combining, referring to FIG. 3, the shrouds 52 53 cover on the cylindrical body 51 from the respective ends, by fitting the polygonal portion 513 into the polygonal root recess 524, the shroud 52 is located on the cylindrical body 51, meanwhile the through-hole 521 coincides over the locking hole 514. Then mounting the shroud 53, by engaging the back end of the opening 535 with the chucking lug 522 and turning the shrouds 52 53 in an opposite directions respectively so that the projection 526 slides along the sliding slot 534 until it is blocked by the inner end wall., hence the shrouds 52 53 are blocked and securely attached.

Figure 4:
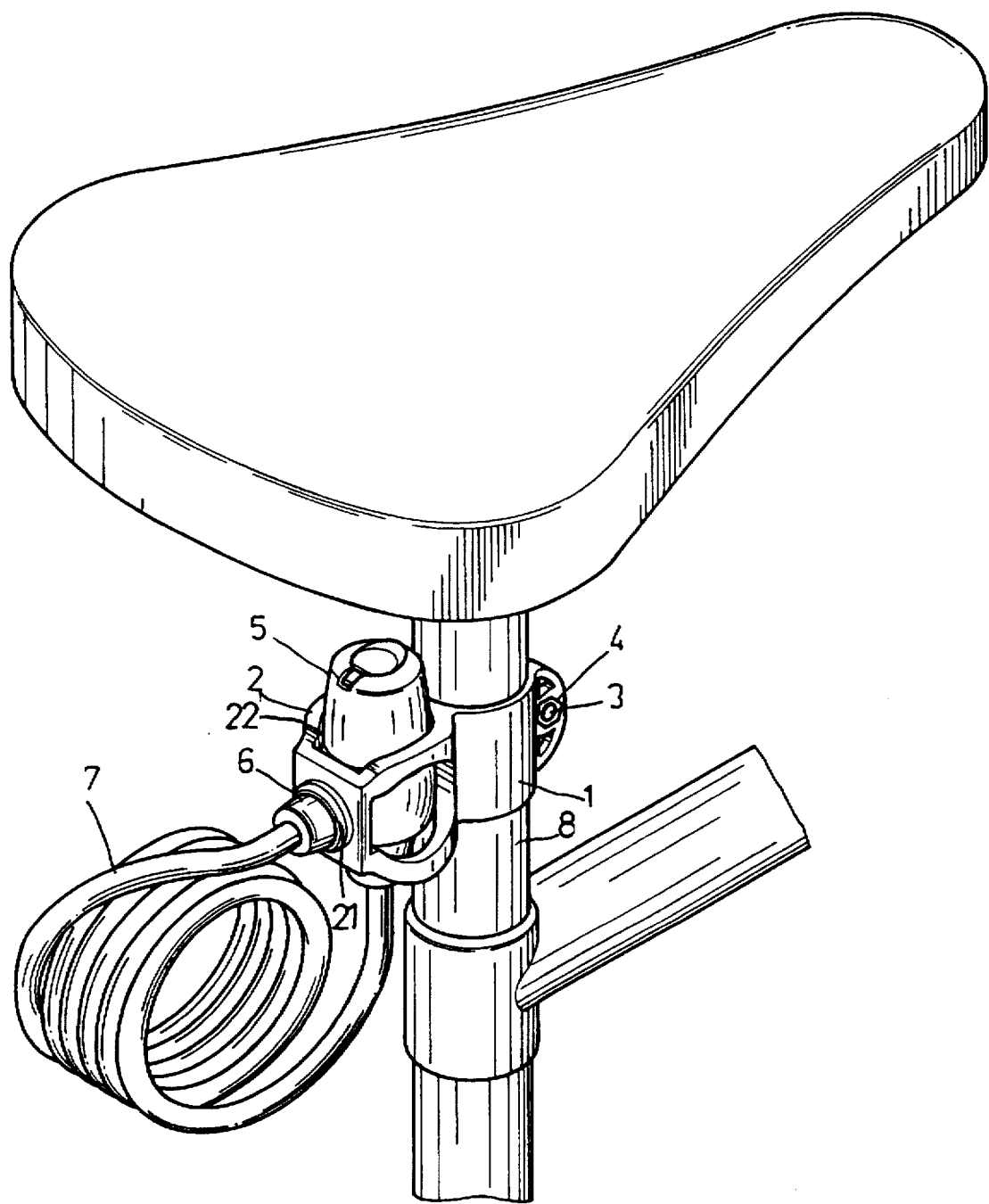
FIG. 4 is a perspective view showing a first operating state of the present invention.
Figure 5:
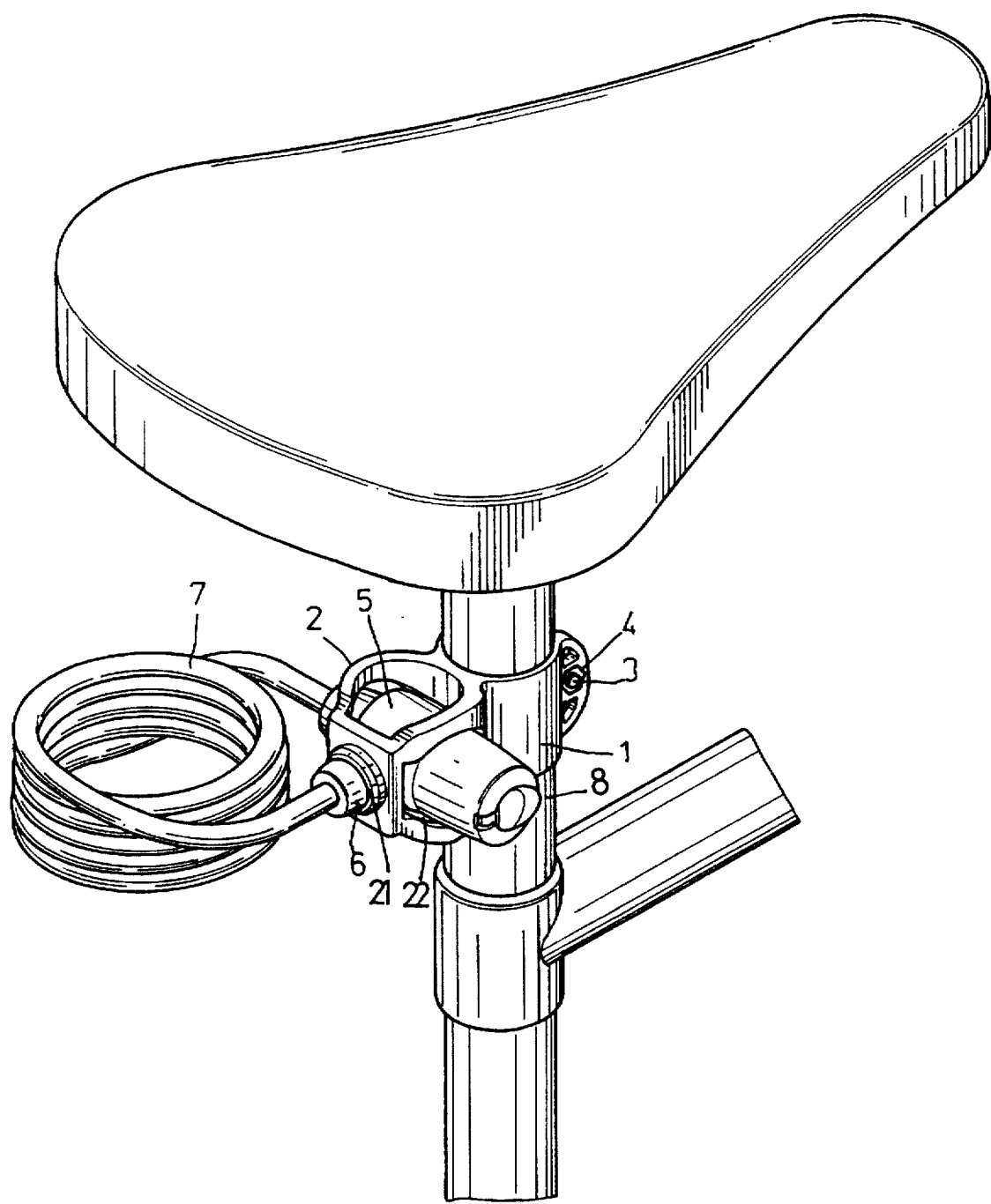
FIG. 5 is a perspective view showing a second operating state of the present invention.
Figure 6:
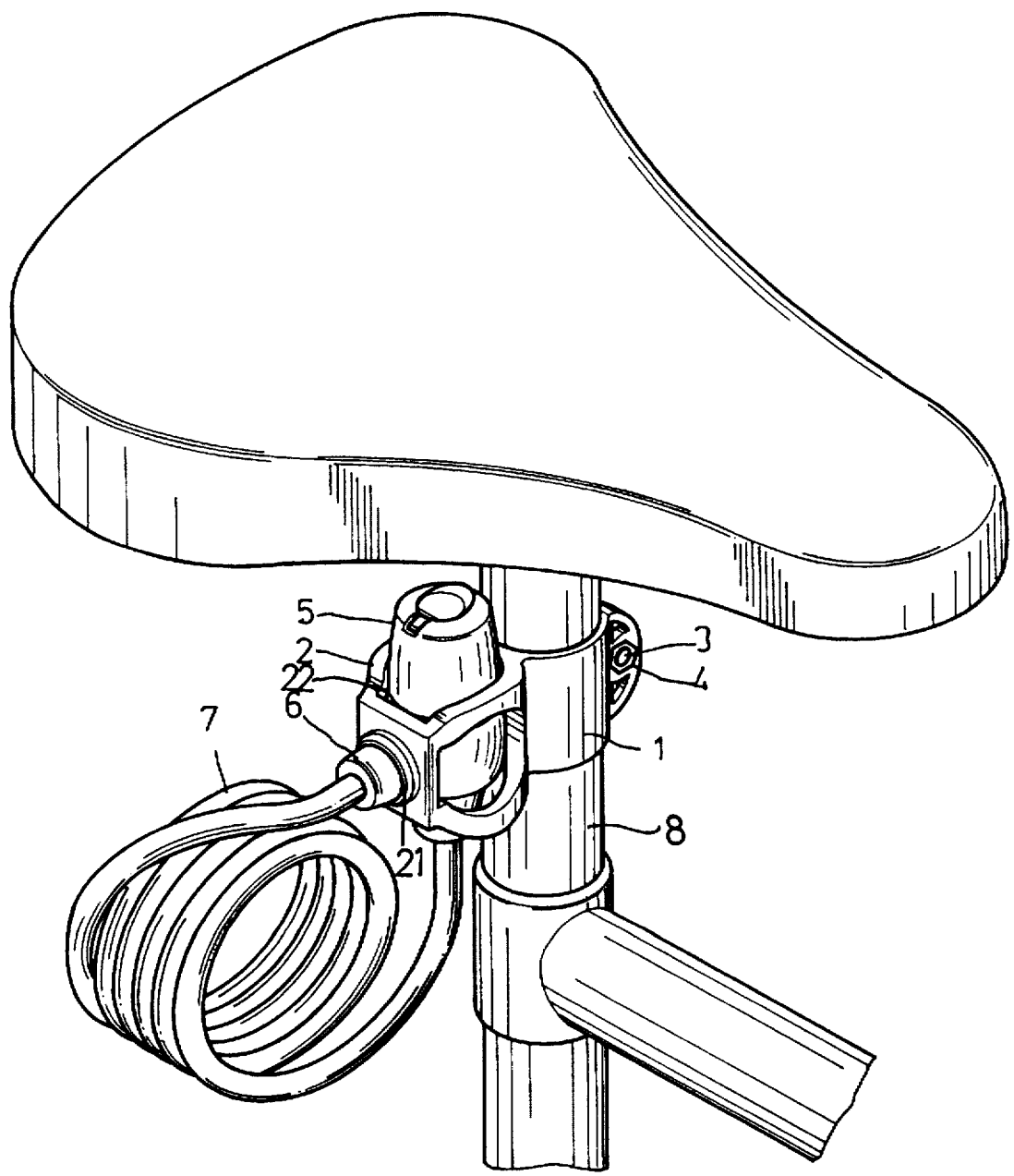
FIG. 6 is a perspective view showing a third operating state of the present invention.
Figure 7:
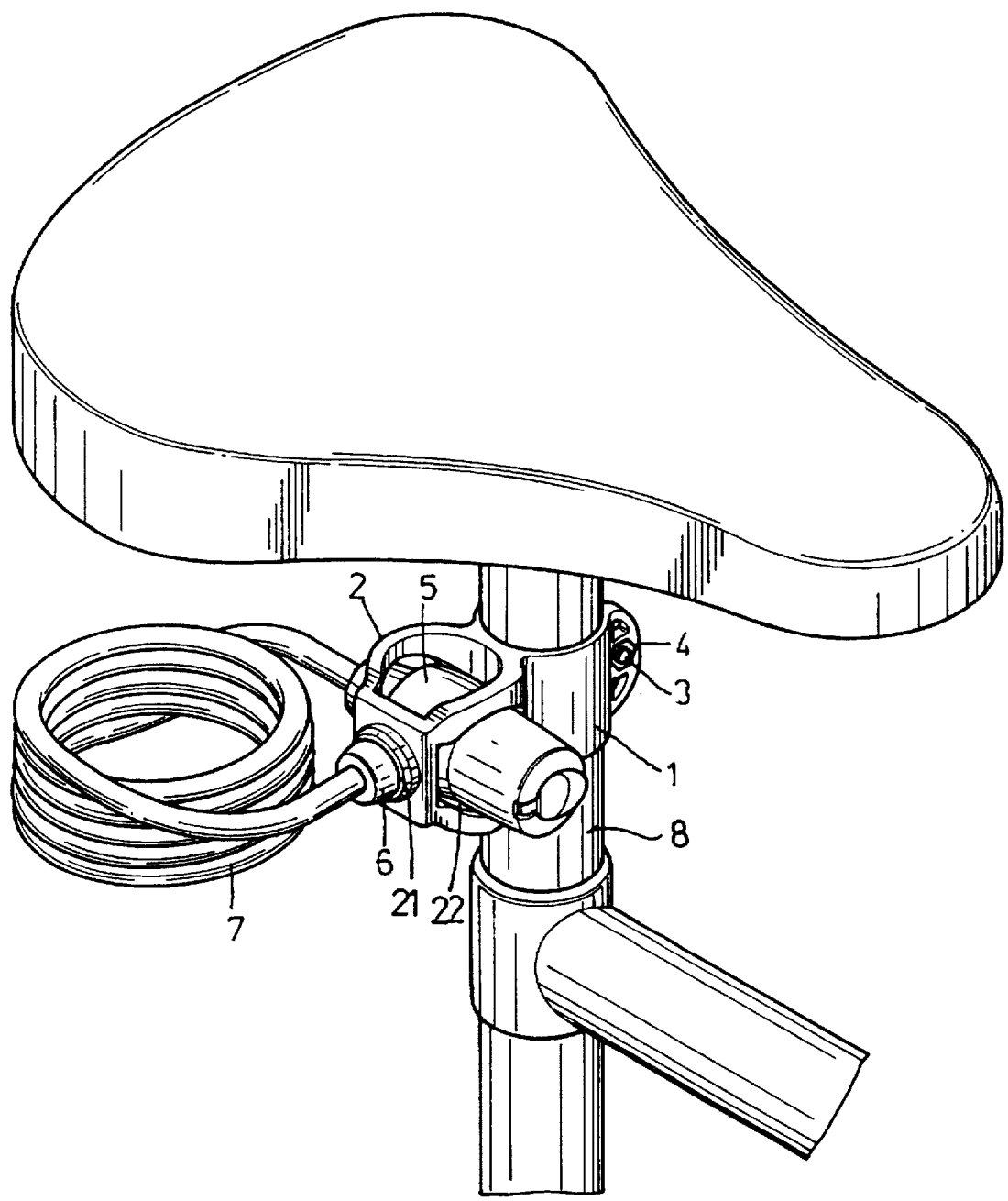
FIG. 7 is a perspective view showing a fourth operating state of the present invention.
Figure 8:
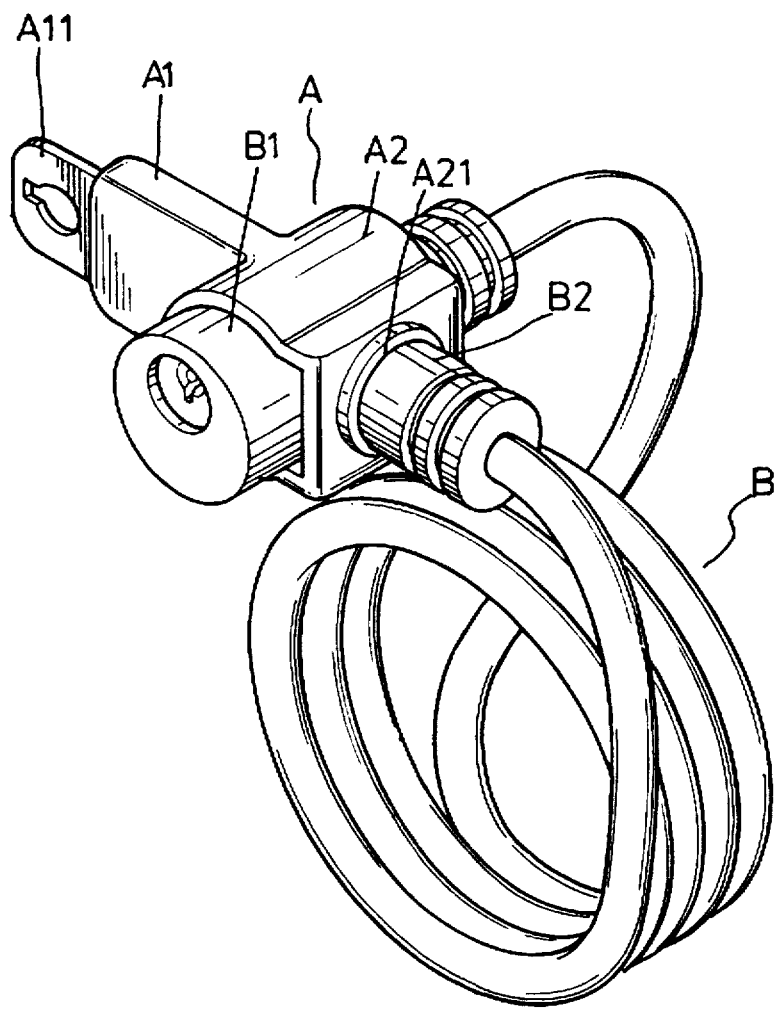
FIG. 8 is a perspective view showing a conventional cable lock and a hold-down support.
Figure 9:
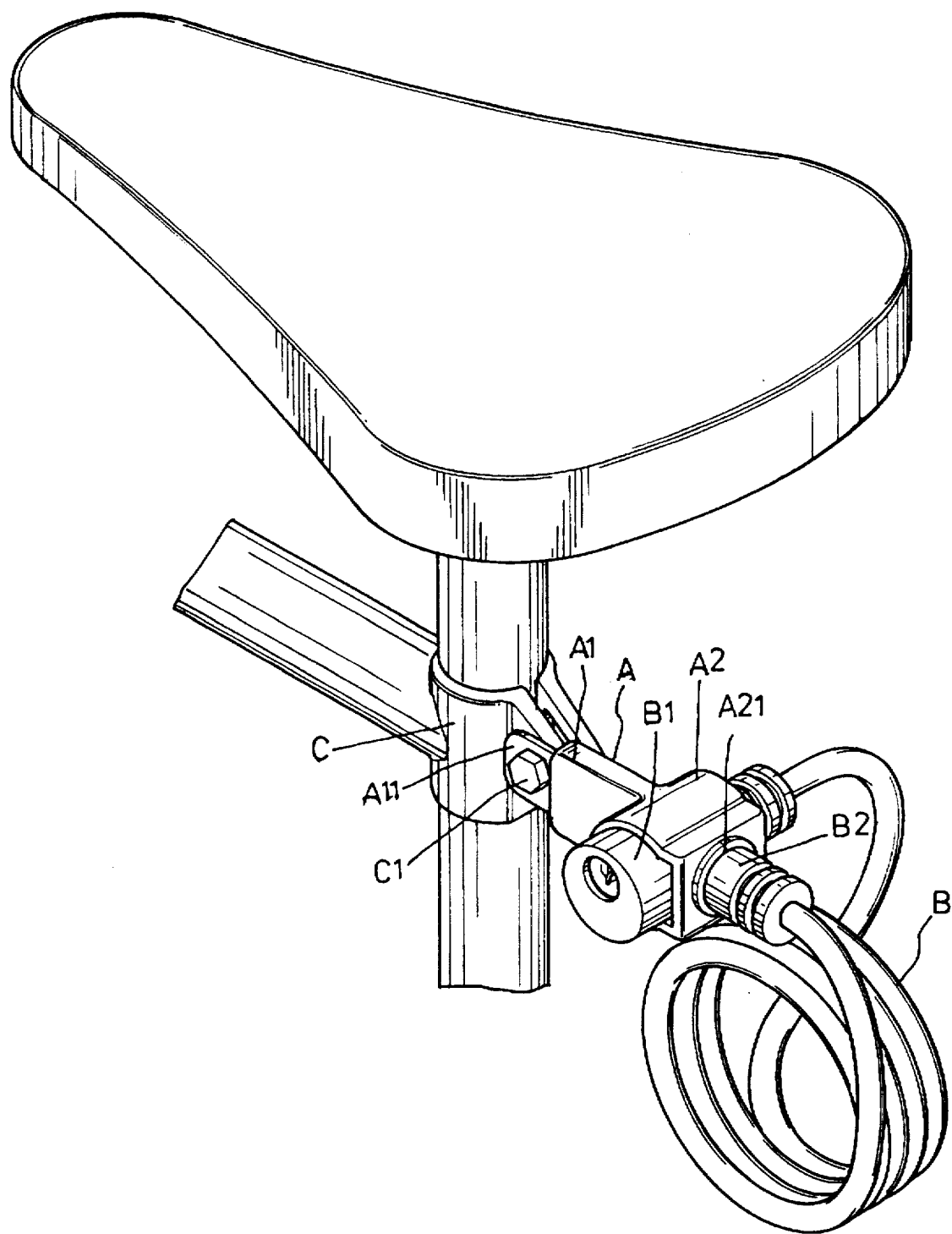
FIG. 9 is a perspective view showing a conventional cable lock and a hold-down support in practicing.

In practicing, cooperating with said hold-down support, firstly, securing the staying bracket 1 on a desired position of the seat support 8 of a bicycle frame, as shown in FIG. 4 and the lock housing 5 of the cable lock can be inserted into the opening 22 from at any desired position, and the latch 6 is locked in the trepan 21 of the lock housing 2. Referring to FIG. 4 and FIG. 5, the lock housing 5 can be placed in the holder 2 in four different ways, in order for the cable 7 to be arranged in a proper routing place for avoiding it from being steal or interfere the rear seat. For this reason, the staying bracket 1 is able to change the fixing direction by turning it to the desired direction, as shown in FIG. 6 and FIG. 7. In addition, the hold-down support can be fixed on any other place of the bicycle frame such that to be more useful.

I claim:

1. A cable lock and universal hold-down support comprising:

(a) a lock and a cable;

(b) a cylindrical body having said lock located therein, said cylindrical body having a lower section formed into a polygonal cross-section contour, a first end of said cable being coupled to a lower end of said cylindrical body, said cable having a latch formed on a second end for insertion into said cylindrical body through a locking hold formed therethrough;

(c) an upper shroud for mounting over said cylindrical body and said lock, said upper shroud having a lower section and an upper section, said lower section having an upper shroud opening formed through a wall thereof, and an upper shroud slot formed within said wall; and, (d) a lower shroud which non-rotatably seats with said lower section of said cylindrical body and matingly engages said upper shroud, said lower shroud having at lower shroud through opening alignable with said locking hole and said upper shroud opening, said lower shroud having a lug member formed on an inner wall of a peripheral section of said lower shroud through opening for insert within said upper shroud opening and at least one projection member formed on said inner wall for insert into said upper shroud slot for effecting engagement therebetween.

2. The cable lock and universal hold-down support as recited in claim 1 where said lower shroud includes an internal shoulder section for supporting said cylindrical body.

3. The cable lock and universal hold-down support as recited in claim 2 where said lower shroud internal shoulder section defines a polygonally contoured recess for non-rotatably seating said polygonal cross-section contour of said cylindrical body lower section.

4. The cable lock and universal hold-down support as recited in claim 1 including a ring member mounted to an outer surface of said upper shroud and an outer surface of said lower shroud located in surrounding relation about an interface section of said upper and lower shrouds.

5. The cable lock and universal hold-down support as recited in claim 1 where said upper shroud and said lower shroud are cooperatingly mounted each to the other in a bayonet interlocking joint section interface.

6. The cable lock and universal hold-down support as recited in claim 1 including an escutcheon member pivotally mounted to an upper surface of said upper shroud for covering a keyhole formed within an upper surface of said lock.

* * * * *